(12) United States Patent
Selmaier et al.

(10) Patent No.: US 12,499,531 B2
(45) Date of Patent: Dec. 16, 2025

(54) COMPUTER-IMPLEMENTED METHOD FOR THE AUTOMATIC CLASSIFICATION OF EMITTER STRUCTURES, APPARATUS FOR CARRYING OUT THE METHOD, MACHINE-READABLE PROGRAM CODE AND STORAGE MEDIUM

(71) Applicant: Siemens Healthcare GmbH, Erlangen (DE)

(72) Inventors: Andreas Selmaier, Erlangen (DE); Benjamin Samuel Lutz, Munich (DE); Jens Fuerst, Herzogenaurach (DE)

(73) Assignee: Siemens Healthineers AG, Forchheim (DE)

( * ) Notice: Subject to any disclaimer, the term of this patent is extended or adjusted under 35 U.S.C. 154(b) by 1002 days.

(21) Appl. No.: 17/580,731

(22) Filed: Jan. 21, 2022

(65) Prior Publication Data

US 2022/0237760 A1    Jul. 28, 2022

(30) Foreign Application Priority Data

Jan. 27, 2021    (EP) .................................... 21153662

(51) Int. Cl.
*G06T 7/00*    (2017.01)
*G06T 5/70*    (2024.01)
(Continued)

(52) U.S. Cl.
CPC ............... *G06T 7/001* (2013.01); *G06T 5/70* (2024.01); *G06V 10/764* (2022.01); *G06V 10/80* (2022.01);
(Continued)

(58) Field of Classification Search
CPC . G06T 7/001; G06T 5/70; G06T 2207/20081; G06T 2207/20084;
(Continued)

(56) References Cited

U.S. PATENT DOCUMENTS

2007/0246789 A1    10/2007 Freudenberger et al.
2009/0185179 A1*    7/2009 Hill ....................... G01N 21/958
356/239.1
(Continued)

FOREIGN PATENT DOCUMENTS

CN    108154504 A    6/2018
CN    110736751 A    1/2020
(Continued)

OTHER PUBLICATIONS

Long Jonathan et al: "Fully convolutional networks for semantic segmentation", 2015 IEEE Conference on Computer Vision and Pattern Recognition (CVPR), pp. 3431-3440, XP055573743, DOI: 10.1109/CVPR.2015.7298965; ISBN: 978-1-4673-6964-0; Sections 1, 3, 4; 2015.

(Continued)

*Primary Examiner* — Xuemei G Chen
(74) *Attorney, Agent, or Firm* — Harness, Dickey & Pierce, P.L.C.

(57) ABSTRACT

At least one example embodiment relates to an apparatus, machine-readable program code, a storage medium and computer-implemented method for the automatic classification of emitter structures embodied to emit electrons for the generation of X-rays, wherein the classification takes place on the basis of a reference image of an emitter structure, wherein the classification comprises a first class and at least one second class, wherein the first class corresponds to a substantially defect-free emitter structure and the at least one second class corresponds to a defective emitter structure. Since, for the classification, an image embodied as a fusion image from a bright-field image and a dark-field image is referred to and the classification of the emitter structure into the first and the second class takes place on the basis of this (Continued)

image, improved defect checking of emitter structures can be provided.

12 Claims, 2 Drawing Sheets

(51) Int. Cl.
*G06V 10/764* (2022.01)
*G06V 10/80* (2022.01)
*G06V 10/82* (2022.01)

(52) U.S. Cl.
CPC .... *G06V 10/82* (2022.01); *G06T 2207/20081* (2013.01); *G06T 2207/20084* (2013.01)

(58) Field of Classification Search
CPC ........ G06T 7/0004; G06T 2207/10116; G06V 10/764; G06V 10/80; G06V 10/82; G06V 10/25; G06F 18/24133; G06F 18/251; G06F 18/2415; G06F 18/25; G06N 3/045; G06N 3/08
See application file for complete search history.

(56) References Cited

U.S. PATENT DOCUMENTS

| 2011/0280377 | A1  | 11/2011 | Freudenberger et al. |
| 2017/0278235 | A1* | 9/2017  | Zou ................. G06T 7/0004 |
| 2019/0318471 | A1* | 10/2019 | Chen ............... G01N 21/8851 |
| 2020/0125898 | A1* | 4/2020  | Zuev ............... G06N 3/045 |
| 2020/0218241 | A1* | 7/2020  | Soltanmohammadi .................... G05B 19/41875 |
| 2022/0012850 | A1* | 1/2022  | Ozcan ................. G06N 3/084 |
| 2022/0027388 | A1* | 1/2022  | Gao .................. G16B 20/20 |
| 2022/0050061 | A1* | 2/2022  | Bar .................. G06T 7/001 |
| 2022/0196571 | A1* | 6/2022  | Fam .................. G01N 21/956 |

FOREIGN PATENT DOCUMENTS

| DE | 102006018633 A1 | 10/2007 |
| DE | 102010020151 A1 | 11/2011 |
| DE | 102019211656 A1 | 2/2021 |

OTHER PUBLICATIONS

Wikipedia "U-Net" https://en.wikipedia.org/wiki/U-Net (downloaded Nov. 13, 2020).

Ronneberger, O. et al. "U-net: Convolutional networks for biomedical image segmentation." Medical Image Computing and Computer-Assisted Intervention—MICCAI 2015: 18th International Conference, Munich, Germany, Oct. 5-9, 2015, Proceedings, Part III 18. Springer International Publishing, 2015.

Mayr, Andreas et al: "Machine Learning in Production—Potentials"; Challenges and Exemplary Applications; Procedia CI RP; Bd. 86, Dec. 31, 2019 (Dec. 31, 2019); Seiten 49-54, XP055821171; Nlissn: 2212-8271, DOI: 10.1016/j.procir.2020.01.035; eite 51-Seite 53;.

Satorres, Martinez et al: "Quality inspection of machined metal parts using an image fusion technique"; Measurement, Bd. 111, Aug. 3, 2017 (Aug. 3, 2017); Seiten 374-383; P085164260,; ISSN: 0263-2241, DOI: 10.1016/J.MEASUREMENT.2017.08.002 Zusammenfassung: Seite 375-Seite 381; Abbildung 4.

* cited by examiner

COMPUTER-IMPLEMENTED METHOD FOR THE AUTOMATIC CLASSIFICATION OF EMITTER STRUCTURES, APPARATUS FOR CARRYING OUT THE METHOD, MACHINE-READABLE PROGRAM CODE AND STORAGE MEDIUM

PRIORITY STATEMENT

The present application hereby claims priority under 35 U.S.C. § 119 to European patent application number EP 21153662.8 filed Jan. 27, 2021, the entire contents of which are hereby incorporated herein by reference.

FIELD

Example embodiments generally relate to a computer-implemented method for the automatic classification of emitter structures embodied to emit electrons for the generation of X-rays. Example embodiments also relate to an apparatus for carrying out the method, as well as machine-readable program code and a storage medium with machine-readable program code for carrying out the method.

BACKGROUND

Various approaches are used to generate X-rays. For the generation of X-rays, in particular for medical use, typically, electrons are accelerated onto an anode. The interaction of the accelerated electrons with the anode produces X-rays. The quality of the resulting X-rays depends on the provision of the electrons used for this purpose.

Electrons for the generation of X-rays are provided via an emitter, which emits electrons for the generation of X-rays.

The electrons are frequently generated via thermal emission, for example via thermionic emitters, such as a heating wire, or via a flat emitter that can be heated by an electric current flow. Such flat emitters are described, for example, in DE 10 2010 020 151 A1 or DE 10 2006 018 633 A1.

The part of the flat emitter forming the emission surface generally comprises one or more thin sheets made of a high-temperature-resistant metal, such as tungsten. To obtain emission in a defined area of the sheet surface, the flat emitter has to be heated to a high temperature of about 2000-2500 degrees Celsius. This is achieved via an electric current and the intrinsic electrical resistance of the emitter material.

In order to achieve a defined ohmic resistance, the sheet material is generally structured by introducing cuts or slots that are as precise as possible. The emitter sheet of such a thermionic flat emitter is provided with heating current connections via which a heating current is conducted through the emitter sheet. The high temperature to which the emitter sheet is heated causes electrons to be emitted from the emitter sheet and accelerated toward an anode via a high voltage.

On the way from the emitter sheet to the anode, the emitted electrons are focused by a focusing system. When the electrons hit the anode, which is also made of a high-temperature-resistant material, such as tungsten for example, in a focused spot, the deceleration of the electrons causes X-rays to form in the anode material.

Field-effect emitters in which electrons are emitted from the cathode via a field effect are also increasingly used. These frequently comprise needle-shaped structures made, for example, from a material such as silicon, silicon carbide or from carbon nanotubes. Appropriate electrical field strengths at the needle tips cause electrons to be released from the emitter structures. In addition, this emission of electrons can be thermally supported in the case of field-effect emitters. These are then also accelerated to an anode in the desired manner.

Thus, all emitters for the generation of electrons provided for the generation of X-rays have emitter structures that influence the functionality of the emitter.

The decisive factor for good emission behavior of an emitter is that the emitter is manufactured as defect-free as possible. Defects in the emitter structures frequently result in later component failure, lower emission efficiency or undesirable electron distribution during emission, which has a detrimental effect on the quality of the X-rays generated thereby.

To date, emitters have been checked manually by appropriate personnel to ensure they are free of defects. This is a labor-intensive, lengthy and unreliable process since the identification of defects is based on the discretion and experience of individual people. In particular, the detection of defects depends on the concentration level of the checker.

Due to the high level of effort involved, emitter components are frequently not inspected until a defect is present in order to determine the cause of the component failure. The effort involved means that manufactured emitters, in particular all manufactured emitters, are generally also not checked consistently before they are placed on the market.

SUMMARY

At least one example embodiment is directed to a method, an apparatus, machine-readable program code or a storage medium with machine-readable program code with which defect checking of emitter structures can be improved.

At least one example embodiment provides a computer-implemented method for the automatic classification of emitter structures embodied to emit electrons for the generation of X-rays. The method includes classifying emitter structures into a first class and at least one second class based on a reference image of an emitter structure, wherein the first class corresponds to a substantially defect-free emitter structure and the at least one second class corresponds to a defective emitter structure, wherein the classifying uses an image embodied as a fusion image from a bright-field image and a dark-field image and the classifying classifies the emitter structures into the first and the at least one second class based on the fusion image using an artificial neural network trained to classify the emitter structures, wherein a signal is generated by the artificial neural network for outputting the classes ascertained for the emitter structures via the classification.

In at least one example embodiment, the classifying uses a deep neural network trained to classify the emitter structures.

In at least one example embodiment, the classifying uses a plurality of filters and the filters are learned via the training process of the neural network.

In at least one example embodiment, the classifying classifies pixel-by-pixel based on the fusion image of the emitter structures and a pixel environment of the fusion image is taken into account for the classification of a respective pixel, wherein the pixel environment is defined by a predeterminable distance from the pixel to be classified or by a predeterminable area around the pixel to be classified.

In at least one example embodiment, the classifying is performed based on a pixel area from the fusion image, wherein the pixel area is ascertained via an artificial neural network and the classifying classifies pixel-by-pixel or pixel-area-by-pixel-area based on the ascertained pixel area.

In at least one example embodiment, the method further includes reducing signal noise to at least one classification result and the signal is generated based on the noise-reduced classification result.

In at least one example embodiment, at least one of the first class and the at least one second class is represented in a spatially resolved manner.

In at least one example embodiment, the at least one second class is associated with a specific defect, wherein the respective specific defect is selected from the following group of defects: a cut-edge defect, a material defect, a flatness defect and a surface defect.

At least another example embodiment provides an apparatus for carrying out a method for the automatic classification of emitter structures for the generation of X-rays. The apparatus includes an interface configured to receive a bright-field image of the emitter structures, a dark-field image of the emitter structures or a fusion image of the emitter structures generated from the bright-field image and the dark-field image, at least one processor configured to execute machine-readable program code, which, when executed, causes the apparatus to perform a method according to an example embodiment and a signal-output interface for outputting a signal based on the class ascertained for the emitter structure via the classification.

At least another example embodiment provides machine-readable program code for a computing unit comprising control instructions, which, when executed via the computing unit, causes a method according to an example embodiment to be carried out.

At least another example embodiment provides a storage medium with machine-readable program code according to an example embodiment.

At least another example embodiment provides a method for reproducing a classification of an emitter structure. The method includes receiving a signal, wherein the signal is generated using a method according to an example embodiment; and reproducing the emitter structure and the at least one class assigned to the emitter structure based on the received signal.

At least another example embodiment provides an apparatus for reproducing a classification of an emitter structure. The apparatus includes an interface for receiving the received signal and at least one processor configured to execute machine-readable program code, which, when executed, causes the apparatus to reproduce the emitter structure and the at least one class assigned to the emitter structure based on the received signal.

At least another example embodiment provides a control facility including a first computer configured to execute machine-readable program code including control instructions, which, when executed by the first computer, cause a bright-field image and a dark-field image of a same emitter structure or a fusion image from the bright-field image or the dark-field image to be sent to an apparatus for carrying out a method for an automatic classification of emitter structures, wherein the control instructions furthermore cause a method as claimed in claim 1 to be carried out by an apparatus for carrying out a method for the automatic classification of emitter structures and cause a signal based on a class ascertained for the same emitter structure generated by the apparatus to be receivable by the first computer.

BRIEF DESCRIPTION OF THE DRAWINGS

At least some example embodiments are explained in more detail with reference to the following figures, in which.

DETAILED DESCRIPTION

Figure 1:
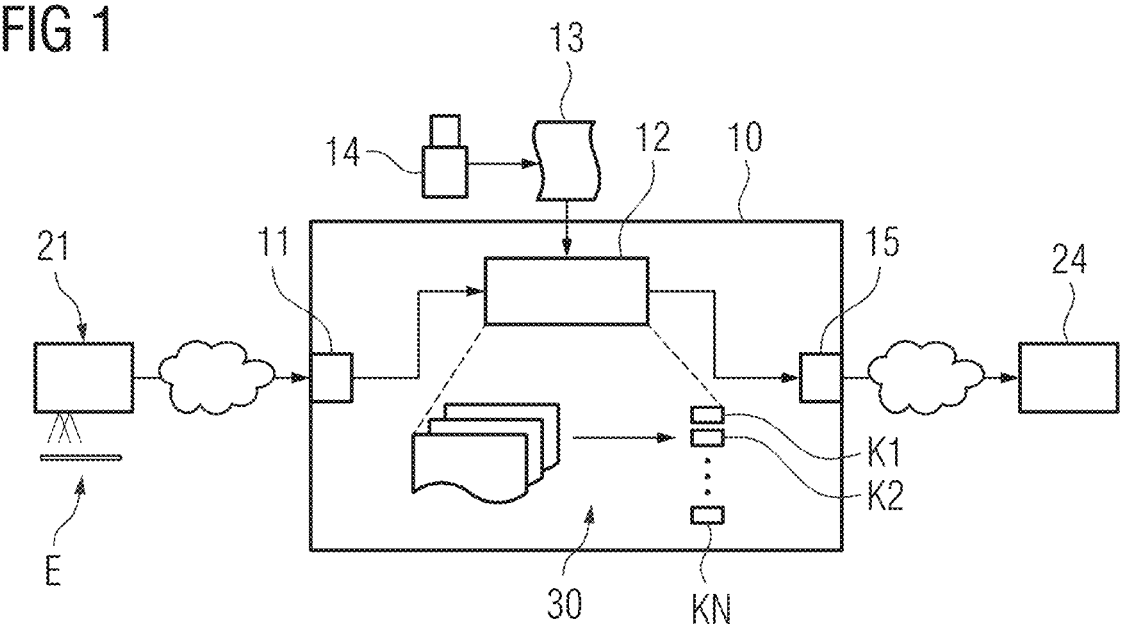
FIG. 1 illustrates a schematic representation of an apparatus for carrying out an embodiment of the classification method.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Example embodiments may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'controller' may be replaced with the term 'circuit.'

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

At least one example embodiment is directed to a computer-implemented method for the automatic classification of emitter structures for the emission of electrons, wherein the classification takes place on the basis of a reference image of an emitter structure, wherein the classification comprises a first class and at least one second class, wherein the first class corresponds to a substantially defect-free emitter structure and the at least one second class corresponds to a defective emitter structure, wherein, for the classification, an image embodied as a fusion image from a bright-field image, in particular from a bright-field microscope image, and a dark-field image, in particular a dark-field microscope image is referred to, in particular received, and the classification of the emitter structures into the first and the second class, i.e., the assignment of emitter structures to the respective class, takes place based on this image via an artificial neural network trained to classify the emitter structure for the classification of the emitter structure, wherein a signal is generated for outputting the class ascertained for the emitter structure via the classification.

The computer-implemented method allows an automated check of emitter structures for the absence or presence of defective emitter structures in an effective and efficient manner. In particular, different types of defects can be distinguished depending on the training process for the neural network. In addition, this solution allows continuous and complete checking of emitters as part of a production process. Compared to the prior art, the method according to at least one example embodiment can be executed more reliably, more quickly and objectively. This can, for example, take place in an automated manner for each emitter leaving production or also as a control step during the production process.

The method can be executed via a network application, for example web-based or cloud-based, or locally on an appropriate apparatus, for example a test apparatus, as part of a production checking process.

If the method is executed locally, i.e., for example within a company network or by a defect-checking apparatus in a production process, the method of image recording of a bright-field image, a dark-field image and the generation of a fusion image from a bright-field image and dark-field image can optionally be a method step of the method.

When the method is applied via a network, in particular as a cloud-based application, the bright-field image and the dark-field image of the emitter structures can be provided separately or also the fusion image combined therefrom.

The bright-field image and the dark-field image of the same emitter structures can, for example, be recorded via a microscope with suitable magnification so that the emitter structures are sufficiently optically resolved or visible. All emitter structures of the emitter relevant for the emission of electrons can be acquired successively via a bright-field image and dark-field image so that the entire emitter can be analyzed for defects in an automated manner.

If no fusion image is provided, the method can optionally also comprise the generation of the fusion image from the bright-field image and the dark-field image. In this case, a data processing step in the form of the generation of the fusion image from the bright-field image and the dark-field image of the same emitter structure is performed before classification.

The emitter structures are classified via the artificial neural network on the basis of the fusion image from a bright-field image and a dark-field image of the same emitter structure. The fusion image forms the basis for the classification. Herein, the classification can take place via the fusion image itself or the fusion image can be preprocessed and then the classification can take place via the preprocessed fusion image.

Classification of the emitter structures that provides satisfactory or good results with respect to defect determination can only take place on the basis of this combination of a bright-field image and dark-field image of the emitter structures.

A fusion image is understood to mean a combination image of a bright-field image or bright-field recording and a dark-field image or dark-field recording of the same emitter structures. In particular, the channels, in particular color channels, of the respective images are combined. For example, in the case of a three-channel bright-field image and a three-channel dark-field image, the fusion image is thus combined to form a six-channel image, namely in each case from the three channels of the bright-field image or the dark-field image. It is also possible for more or less than 3 color channels to be provided for each image. In particular, the bright-field image used can also be a 1-channel bright-field image, in particular a grayscale image, and the dark-field image used can be a 1-channel dark-field image, in particular a grayscale image. In this case, the fusion image then has two channels. Since a fusion image with only two channels is used, the speed at which the classification is carried out is increased. Also, only one training data set of smaller size is required.

The term 'emitter structures' in particular comprises flat-emitter structures and field-effect emitter structures.

After successful classification, an output signal is generated on the basis of which the classification result can be further used, in particular displayed, stored or further processed via a further routine, for example via a transmission interface. Herein, the display can take place at any location, in particular when the classification takes place via a cloud application. This signal can be reproduced, as received or postprocessed, in a monitoring facility for a production plant for emitters in order to monitor the production process.

If the computer-implemented method is executed locally, it can also comprise the method step of outputting, in particular displaying, the classification for the emitter structures.

The term 'first and second classes' is used to distinguish the classes and in particular does not define any sequence of the classes.

The first class, which corresponds to a defect-free emitter structure, can be provided as an explicit class of the artificial neural network. However, this first class can also be embodied as an implicit class of the neural network. In the latter case, this first class is assigned all pixels which cannot be assigned or are not assignable via the neural network to any of the second, third, fourth, classes etc. as the existing defect classes; this may also comprise a class "other defects".

In one example embodiment, the classification takes place via an artificial deep neural network, in particular a convolutional neural network, trained to classify the emitter structure. It has been shown that a convolutional neural network, in particular trained via supervised learning on the basis of known emitter structures and their known defects, achieves good results for defect-based classification of emitter structures. The filters applied by the convolutional neural network are preferably not manually specified, but learned during the training of the neural network. The convolutional neural network can in particular have three convolutional layers, wherein, for example, the first convolutional layer has 32 filters, the second convolutional layer has 64 filters and the third convolutional layer has 128 filters. It is preferable to start with a filter count for the first convolutional layer, for example 8, 16 or 32, and then increase this by a factor of 2 for each further convolutional layer present. In particular, an activation function can be provided for each convolutional layer, for example a relu activation function, wherein "relu" stands for rectified linear unit, so that only values exceeding a threshold value are forwarded.

It is also possible to provide only one single convolutional layer or also two, four, five or more convolutional layers. Depending on the available training data, the classification result generally improves as the number of convolutional layers increases. Herein, the number of filters can be increased by a factor of 2 for each convolutional layer, starting, for example, with 32 filters for a first convolutional layer. Then, 64 filters can be used for the second convolutional layer, 128 filters for the third convolutional layer, 256 filters for the fourth convolutional layer and 512 filters for the fifth convolutional layer.

Furthermore, a pooling operation can be provided after each convolutional layer, in particular for the first three convolutional layers. Pooling entails a reduction of data, in particular via max pooling or mean pooling, for example. In the case of max pooling, only the strongest activity from a predetermined number of neuron activity values, for example activity values of a matrix of 2×2 neurons, is further used. In this case, data is reduced by 75 percent or to a quarter of the image data. The other values are discarded. In the case of mean pooling, data is reduced by averaging the neuron activity values.

If more than three convolutional layers are provided, further operations for subsequent convolutional layers can be omitted, in particular after the associated pooling operation, in order not to reduce the data excessively.

Subsequently, the values obtained after the convolutional layer and pooling operation can be transformed into a 1D vector, also called flattening, and classified via a conventional neural network. This part of the network can in particular have two hidden layers. Typically, it is furthermore possible to apply a softmax function, via which a standardized probability distribution is carried out for the ascertained classes.

With regard to the determination of hyperparameters of the artificial neural network, i.e., the network topology to be selected, it is possible to use a Gaussian process with regard to a corresponding optimization function for the network. Possible hyperparameters are in particular: type of activation function, such as, for example, relu function, tangent function, sigmoid function, etc., network depth, i.e., the number of layers, the size of the pixel environment, where taken into account, and, for example, the number of neurons and the number of hidden layers of the fully interconnected neural network downstream of the convolutional layers. It is also possible to take account of the learning rate.

According to a further embodiment of the method, the classification takes place pixel-by-pixel based on the fusion image of the emitter structures, wherein a pixel environment in the fusion image is taken into account for the classification of the respective pixel, wherein the pixel environment to be taken into account is defined via a distance from the pixel to be classified or via an area around the pixel to be classified.

For the pixel-by-pixel classification, the size and shape of the pixel environment to be taken into account in each case may be constant. However, the pixel environment can also be embodied as variable, in particular variable pixel-by-pixel. For example, differently defined pixel environments can be used for different filters. The pixel environment can, for example, be embodied as circular. The pixel environment around the pixel to be classified is then limited by a distance radius starting from the pixel to be classified. However, the pixel environment to be taken into account can also have other shapes, for example a rectangular, square, or any polygonal shape. Square pixel environments with a size of 32×32 pixels or 48×48 pixels around the pixel to be classified have been found to be particularly suitable.

According to a further embodiment of the method, the classification takes place on the basis of a pixel area selected from the fusion image, wherein the pixel area is ascertained via an artificial neural network, in particular an encoder-decoder network, and a pixel-by-pixel or pixel-area-by-pixel-area classification takes place based on the ascertained pixel area.

A pixel area comprises a plurality of, generally spatially adjacent, pixels from the fusion image and combines these to form an analysis region. The generation of corresponding pixel areas represents example preprocessing of the fusion image as mentioned above. The fusion image can thus be divided into a plurality, in particular a multiplicity, of non-overlapping pixel areas, which are then classified.

The pixel area or pixel areas to be classified is/are ascertained via an appropriately trained neural network, for example an encoder-decoder network. This is determined in such a way that the features for the classification may be extracted from the fusion image. Such a neural network to be learned can be used to generate a compressed representation, i.e., an encoded image, for the fusion image. The classification then takes place on the basis of this compressed representation of the fusion image. In this case, if this takes place on a pixel-by-pixel basis, this also comprises decoding.

In particular, when classifying a pixel area, it is possible to ignore an environment of the pixel area or the environment of the pixel area is not taken into account for the classification.

The classification of pixel areas of the fusion image allows data reduction and a faster pixel-by-pixel classification for the fusion image. The classification result can be available on a pixel-by-pixel basis, i.e., a specific class is assigned to each pixel. It is also possible for a specific class to be assigned to the entire pixel area.

For classification on the basis of pixel areas, in particular pixel-by-pixel classification on the basis of pixel areas, it is advantageous to increase the number of convolutional layers significantly, for example to several tens of convolutional layers.

In a further embodiment of the method, between the ascertaining of the classification and the generation of the signal for outputting the ascertained class, a method for reducing the, in particular local, signal noise is applied to at least one classification result and the signal for outputting is generated on the basis of the noise-reduced classification result. This postprocessing of the classification enables, for example, the entire area per defect class to be determined as the number of all pixels of the respective class. This also enables, for example, the frequency of a specific defect to be ascertained or also the local distribution or relative position of the specific defects or all the defects to be determined.

The method used to reduce the, in particular local, signal noise can, for example, be a mathematical morphological operation. In particular, erosion and dilation can be executed repeatedly, also known as an opening operation, in order to reduce the noise.

Advantageously, an output signal can be generated via which at least one ascertained class can be represented on a result image of the emitter structures in a spatially resolved manner, all ascertained classes can be represented on an image of the emitter structures in a spatially resolved manner. A result image is an image in which the emitter or a part of the emitter is represented schematically or with the emitter structures on which at least one class is reproduced in a spatially resolved manner. The result image can comprise a schematic reproduction of the emitter or a part thereof, a bright-field image, a dark-field image or any other image of the emitter or a part thereof.

In particular, the emitter structures and the at least one class represented in the result image, in particular all the classes found during the classification, can be represented in SI units. For this purpose, the pixel size is calibrated to SI units.

A multiplicity of emitter structures of the emitter or the entire emitter with the classes present can be represented in the result image. This can provide a good overview of the local distribution of the classes over the emitter. For example, this enables a conclusion to be drawn regarding a faulty production process step, which, for example, causes scratches on the emitter.

In particular, a result image for a multiplicity of emitter structures or for the entire emitter can be provided from the individual images of emitter structures. This can, for example, take place as a composite result image with emitter structures, i.e., with emitter structures from different local areas of the emitter which, at suitable resolution, do not fit onto a single bright-field image or dark-field image. This can in particular take place when the images of the emitter structures are microscope images in each case. Furthermore, in particular the bright-field images or dark-field images, on which the classification is based anyway, can be used for the generation of a composite result image with an image area that is larger than that of the individual bright-field or dark-field image.

In a further variant of the method, classification takes place in such a way that at least one second class is assigned to a specific defect in each case, wherein the respective specific defect is selected from the following group of defects: cut-edge defect, material defect, flatness defect, surface defect. In addition to the second class, third, fourth, fifth classes, etc. may also exist which are in each case assigned to a specific defect. Herein, for example, the types of defects named can also be further differentiated. For example, the class of surface defects can be further differentiated, for example into a class for "contamination", a further class for "chipping or chipped sections", a further class for "scratches", a further class for "stains", a further class for "dust particles", a further class for "burns" etc. representing all surface defects. It is also, for example, possible to provide a plurality of classes for cut-edge defects, such as, for example, "cut-edge chipping" or "deviation from nominal cut edge". The same applies analogously to material defects. Thus, for example, a class can be provided for "non-crystallized material", a further class for "material inclusions", a further class for "dislocations in the crystal structure of the material". Furthermore, a class can be provided for "flatness defects", i.e., an undesired undulating formation of the emitter structure, for example due to internal stresses in the material.

The provision of a plurality or multiplicity of classes, in particular third, fourth classes etc., enables detailed differentiation between different defects of the emitter structure. Furthermore, if desired, these can also be aggregated or grouped into certain types of defects, for example surface defects, material defects, etc.

At least one example embodiment is directed to an apparatus for carrying out a method for the automatic classification of emitter structures for the generation of X-rays, with an interface for receiving a bright-field image of the emitter structures, a dark-field image of the emitter structures or a fusion image generated from a bright-field image and a dark-field image of the emitter structures, with a computing unit into which machine-readable program code can be loaded, which, when executed, causes the method as claimed in one of claims 1 to 8 to be carried out, and with a signal-output interface for outputting a signal based on the classes ascertained for the emitter structure via the classification.

The apparatus can optionally comprise an image recording system for recording a bright-field image and/or a dark-field image. The image recording system for recording a bright-field image and the image recording system for recording a dark-field image can be implemented within one recording system or embodied as separate image recording systems. However, in the case of separate image recording systems, it is necessary to ensure that substantially congruent images of the emitter structures are acquired for the bright-field image and the dark-field image so that a suitable fusion image can be ascertained therefrom.

Furthermore, the apparatus can optionally also comprise a reproducing facility for reproducing the output signal based on the class ascertained for the emitter structure via the classification, for example a display and/or a voice output apparatus.

In the context of classification carried out remotely, i.e., for example via the internet and thus not locally, for example via a cloud or web application, it is generally sufficient and necessary for the apparatus only to comprise an interface for receiving the bright-field images, the dark-field images or the fusion image or fusion images already generated therefrom. The interface is used to provide the data required for the computing unit so that the classification of the emitter structure via the computing unit can be executed on the basis of the fusion image. Such an interface is also provided in "locally operated" apparatuses.

At least one example embodiment is directed to a computer program product and/or via a machine-readable program code for a computing unit comprising control instructions, which, when executed via a computing unit, causes the method according to at least one example embodiment to be carried out.

At least one example embodiment is directed to a storage medium with machine-readable program code according to at least one example embodiment.

At least one example embodiment is directed to a method for reproducing, in particular displaying, a classification of an emitter structure, wherein a signal for the outputting, generated via a method as claimed in one of claims 1 to 8, is received, wherein reproduction of the emitter structure and at least one class assigned to the emitter structure takes place on the basis of the received signal for the outputting.

At least one example embodiment is directed to an apparatus for reproducing, in particular displaying, a classification of an emitter structure comprising an interface for receiving a signal for the outputting from an apparatus according to at least one example embodiment, a computing unit assigned to the reproducing apparatus into which machine-readable program code can be loaded, which, when executed, causes a method according to at least one example embodiment to be carried out, and comprising a facility for reproducing an emitter structure and at least one class assigned to the emitter structure on the basis of the received signal for the outputting.

At least one example embodiment is directed to a control facility of a first computer, for example a client computer, in particular at a production plant for emitters, with machine-readable program code comprising control instructions, which, when executed, cause a bright-field image and a dark-field image of the same emitter structure or a fusion image from such a bright-field image or dark-field image to be sent to an apparatus as claimed in claim 9, wherein the control instructions furthermore cause a method according to at least one example embodiment to be carried out via an apparatus according to at least one example embodiment and cause the signal for the outputting generated by the apparatus according to at least one example embodiment to be receivable by the first computer.

In order to cause the method to be carried out, it can be sufficient for the control instructions to only indirectly cause the method according to at least one example embodiment to be carried out, for example to send a request for the method to be carried out to the apparatus according to at least one example embodiment. The time at which the method is carried out and the monitoring of the course of the method can be controlled on the part of the apparatus according to at least one example embodiment, in particular depending on existing requests from further clients and available resources, in particular computing resources. The signal for the outputting generated via the method according to at least one example embodiment is then received again by the first computer. This can be caused by a query from the first computer to the apparatus according to at least one example embodiment, for example as to whether the signal for the outputting for the transmitted request is already present and then—depending on the presence of the signal for the outputting—transmitted. Alternatively, the apparatus according to at least one example embodiment can send this directly to the first computer, i.e., without it requesting the presence of the signal for the outputting, for example as soon as this is present or also with a desired delay, wherein for example a receiving interface of the first computer is actuated such that this is able to receive the signal for the outputting from the apparatus according to at least one example embodiment.

FIG. 1 shows a schematic representation of an apparatus 10 via which the method for determining defects for emitter structures E can be executed in a cloud environment. Thus, the method is, for example, executed by a corresponding cloud server 10.

To carry out the classification of emitter structures E with respect to the presence of defects, it is first necessary to provide an image with emitter structures E.

For this purpose, an image recording system 21, for example an appropriate microscope, records a bright-field image and a dark-field image of the emitter structures E to be classified. Furthermore, all functionally relevant parts of the emitter can be scanned or sampled at suitable resolution via the image recording system 21. In an example embodiment, this image recording system 21 is not part of the apparatus 10.

If the entire method for the classification of an emitter structure E is executed locally, for example in a production plant for emitters and not involving a cloud, the apparatus 10 can also comprise the image recording system 21.

In the present case, at least one bright-field image and the dark-field image of the same emitter structure E are sent to a receiving interface 11 of the apparatus 10. If necessary, these can be combined to form a fusion image before being sent to the receiving interface 11 of the apparatus 10.

However, the fusion image of a bright-field image and dark-field image can also be generated via the apparatus 10 or a computing unit 12 comprised by the apparatus 10.

The classification of emitter structures E which takes place via the computing unit 12 is based on the fusion image. The fusion image comprises the image channels of the bright-field image and the dark-field image of the respective emitter structure E, i.e., for example 6 color channels, namely the 3 R (red), G (green), B (blue) channels of the bright-field image and the R, G, B channels of the dark-field image. Instead of the RGB system, it is, for example, also possible to use the CMYK system. Accordingly, the number of color channels changes from three to four or from six to eight for the fusion image.

The computing unit 12 can load a machine-readable program code 13 into the working memory of the computing unit 12. The machine-readable program code 13 is designed such that, when executed, it causes the classification of the emitter structures E to be carried out based on the fusion image. Before being loaded by the computing unit 12, the machine-readable program code 13 is permanently stored on a storage medium 14 and can be retrieved or loaded therefrom.

The machine-readable program code 13 comprises control instructions comprising the use of an artificial neural network in the form of a convolutional neural network 30. This convolutional neural network 30 has been trained in advance for the classification of emitter structures E via fusion images with known emitter defects or defect classes.

For this purpose, it is necessary to create a data set of pairs of emitter structures via a bright-field image and dark-field image and the associated classes, in particular for each pixel. In the learning phase, the convolutional neural network evaluates these data sets in order to learn the relationships between the input data, i.e., the emitter structures of the fusion image, and the output values, the classes, for the emitter structures.

In particular, the network is trained by supervised learning, wherein the stochastic gradient descent method with a categorical loss function is used to support the training process. It is also possible to use other loss functions. For example, the most suitable loss function can be ascertained during the optimization of the hyperparameters of the neural network or convolutional neural network used. The corresponding gradients are determined using backpropagation.

If the boundary conditions for the analysis of the emitter structure change significantly, for example due to a change in technology, it may be necessary to provide further learning processes to adapt the model.

When the trained convolutional neural network 30 is applied, i.e., when training is completed, emitter structures E present as a fusion image are classified via the correspondingly trained convolutional neural network 30, without previously defined classes for these emitter structures E being known. The class present for the respective emitter structure E is ascertained on the basis of the trained convolutional neural network 30. In addition, a softmax function is used for the classification in order to obtain a standardized distribution of the classes.

The fusion image is analyzed pixel-by-pixel via the trained convolutional neural network 30 and surrounding or adjacent pixels in an area of defined size are taken into account for the classification of each pixel. This convolutional neural network 30 assigns one of the previously defined classes K1, K2,-KN to each pixel, wherein N is an integral positive number equal to or greater than 3, preferably between 4 and 12. The classes can, for example, correspond to: poorly guided cut edges, chipped cut edge, non-crystallized areas, undulating areas, scratches, chipped focus head, contamination, dust, burnt areas, stains, etc.

In particular, the assignment can take place in such a way that a probability of each pixel falling into various classes is ascertained. The respective pixel is then assigned to the class for which the classification has ascertained the highest probability.

After the evaluation of all pixels via the convolutional neural network 30, postprocessing takes place, in particular across fusion images, in order to reduce local signal noise, for example, by applying the opening operation i.e., erosion followed by dilation. In the image postprocessed in this way, it is now possible to determine the total area for each defect class as the number of all pixels in the respective class. It is also possible to determine other characteristic values, such as the frequency of a defect or the relative position of the defects to one another or on the emitter.

The conversion of pixels to SI units takes place, for example, based on a one-off calibration. For this, an image with marks at fixed distances is recorded (for example a grid with line spacing of 1 mm) and the distance between the marks in the image determined in pixels, thus establishing the relationship between SI units and pixel size.

Following the classification of the fusion image, an output signal is generated which can then be displayed via a signal-output interface 15, in particular after transmission from the cloud, on a reproducing apparatus 24, such as a monitor, arranged, for example, in a production plant for emitters.

The represented image preferably acquires inter alia the emitter structures E of the entire emitter and thus, for example,—in addition to restricting the observation to specific emitter structures E, selected by the user, for example—also allows an overview of the defect distribution and the local distribution of the defect classes over the entire emitter on a result image.

On the basis of this local distribution of the classes, the emitter can, for example, be cropped so that only defect-free emitter structures E are further used and defective emitter structures E are removed from the process. This is in particular possible if an emitter is constructed in a modular manner from separate emitter structures E.

Figure 2:
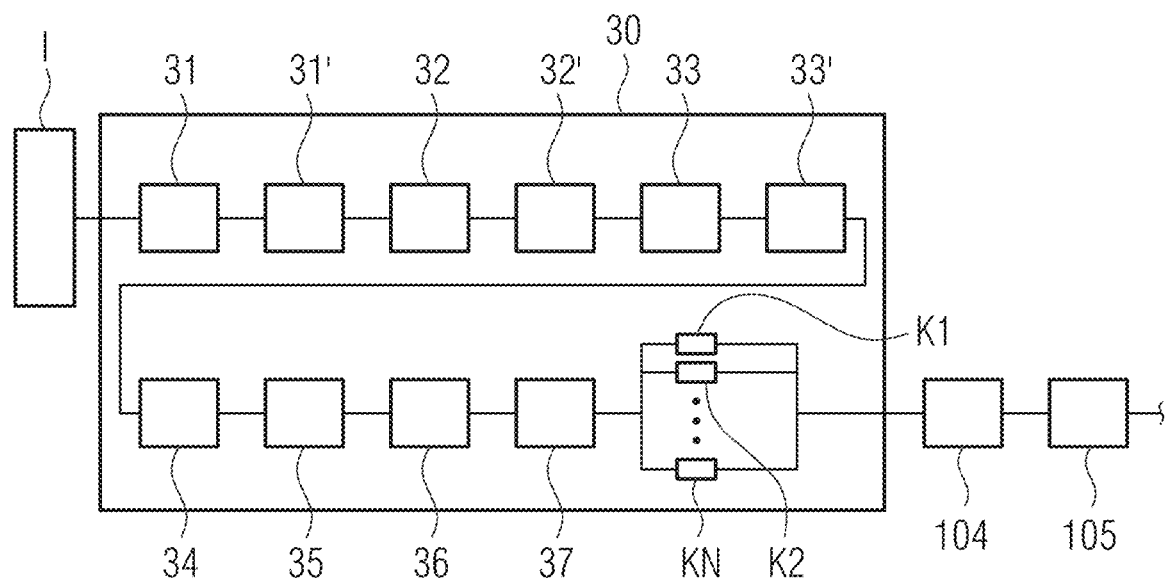
FIG. 2 illustrates a schematic structure of a suitable convolutional neural network for carrying out an embodiment of the method.

FIG. 2 shows a schematic structure of a convolutional neural network 30, which can be applied for the classification of emitter defects.

Starting from an input image I, the fusion image, the convolutional neural network 30 has three convolutional layers 31, 32 and 33. These are generated via appropriate filters that were learned during the training process. Herein, for example, thirty-two filters are used for the first convolutional layer 31, sixty-four filters are used for the second convolutional layer 32 and one hundred and twenty-eight filters are used for the third convolutional layer 33. Herein, a relu activation function is used for each convolutional layer 31 or 32 or 33, i.e., only values that exceed a threshold value (generally "0") are forwarded. Each convolutional layer 31, 32 or 33 is followed by a pooling operation 31', 32' or 33'. There, after the max pooling method, only the maximum value of the filter, for example a 2×2 matrix, is further used after the convolution carried out in each case. Herein, the image size is reduced to a quarter, i.e., three values are discarded and one value is used further.

The third pooling 33' is followed by so-called flattening 34, i.e., after the third pooling 33', the data is transformed into a 1D vector. This 1D vector is classified via a conventional neural feed-forward network. For this, a first hidden layer 35 and a second hidden layer 36 are used, each of which is fully connected to the layers before it and behind it. The first hidden layer 35 preferably has 32 neurons, the second hidden layer 36 preferably has 8 neurons, in particular with a downstream activation function in each case.

The second hidden layer 36 is followed by an output layer 37. This has, for example, 4 neurons, wherein each neuron corresponds to a class. Furthermore, the classes are standardized via a softmax function. Therefore, a classification for the analyzed emitter structures performed by the convolutional neural network 30 is now available. The number of neurons can also be increased depending on the number of desired classes, for example to 8 or 10. In this case, the number of neurons in the first and second hidden layers can be increased. For example, 256 or 128 neurons can be provided for the first hidden layer and 128 or 64 neurons for the second hidden layer.

The choice of a higher number of classes has the advantage that, after classification, they can still be aggregated or grouped into specific superordinate categories, such as, for example, surface defects. If only a small number of classes is ascertained, the result cannot be subsequently further diversified. In this respect, the number of classes specifies the maximum granularity of the result diversification.

This is followed by a postprocessing step 104 of the classification result in such a way that the signal noise is reduced. Various morphological mathematical operations can be used for this purpose. An opening operation comprising erosion of the signal and subsequent dilation of the signal may be applied.

This is followed in a further step 105 by the generation of an output signal, for example via the computing unit 12, which can then be sent to the corresponding receiver via the signal-output interface 15 shown in FIG. 1.

Figure 3:
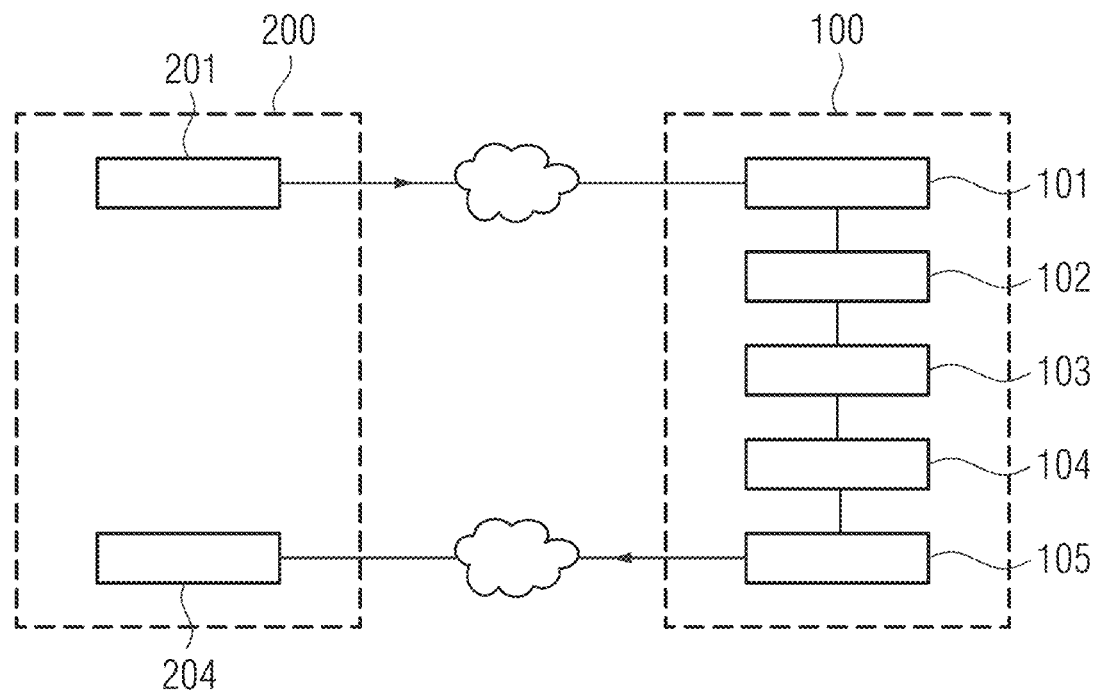
FIG. 3 illustrates a schematic representation of a course of a method for an example embodiment of the classification method.

FIG. 3 shows a schematic representation of an embodiment of the method for classifying emitter structures with respect to defects.

The method for classifying the emitter structures with respect to freedom from defects or the presence of a defect or a specific type of defect is denoted by the reference character 100. This is executed as a cloud application and receives the required image data, for example via an internet connection, from a first computer 200, for example a client computer.

First, in a first step 201, a bright-field image of emitter structures is recorded. This is followed in a next step 202 by the recording of a dark-field image of the same emitter structures. In this way, the entire emitter is may be recorded—section-by-section—with a bright-field image and dark-field image. The aforementioned image recordings of the emitter structures are carried out at a first computer, a client, i.e., at a location where the emitter structure to be examined is physically present.

According to the example embodiment in FIG. 3, the fusion image is generated in the cloud environment. For this purpose, in a method step 101, the bright-field image and the dark-field image are received from the cloud application via a receiving interface.

In a method step 102, as a preparatory step for carrying out the subsequent classification, a fusion image is combined from the received bright-field image and the received dark-field image for the respective emitter structures in which the color channels of the respective images are contained in the image data set of an image, the fusion image.

Alternatively, the fusion image can already be generated on the client side and transmitted to the cloud application and then received instead of or possibly in addition to the bright-field image and/or the dark-field image via the receiving interface.

The fusion image is referred to in order to carry out the classification via the convolutional neural network, as explained in accordance with FIG. 2. This classification of the emitter structures of the fusion image takes place in a method step 103.

When the entire image, i.e., each pixel of the fusion image, has been classified, in a method step 104, a local noise reduction method is applied to the classification result so that a local distribution of the classes can be ascertained for the analyzed emitter structures.

In a method step 105, an output signal is generated and then subsequently transmitted back to the client via a signal-output interface.

On the client side, according to a further method step 204, the classification of the analyzed emitter structures is then displayed on a reproducing apparatus, for example on a monitor or another facility for reproducing information. In particular, here, at least part of the emitter can be represented on the display, wherein the local distribution of the classes is reproduced graphically on the part of the emitter. For example, defect-free areas of the emitter are reproduced via a first type of marking, for example a first color, while the further defective classes are, in particular in each case, reproduced with another type of marking, for example a second color for all defective emitter structures or a separate color for each defective class.

The invention claimed is:

1. A computer-implemented method for an automatic classification of emitter structures embodied to emit electrons for the generation of X-rays, comprising:
   classifying emitter structures into a first class and at least one second class based on a reference image of an emitter structure, wherein the first class corresponds to a substantially defect-free emitter structure and the at least one second class corresponds to a defective emitter structure, wherein
   the classifying uses an image embodied as a fusion image from a bright-field image and a dark-field image and the classifying classifies the emitter structures into the first and the at least one second class based on the fusion image using an artificial neural network trained to classify the emitter structures, wherein a signal is generated by the artificial neural network for outputting the classes ascertained for the emitter structures via the classification,
   wherein the classifying classifies pixel-by-pixel based on the fusion image of the emitter structures and a pixel environment of the fusion image is taken into account for the classification of a respective pixel, wherein the pixel environment is defined by a predeterminable distance from the pixel to be classified or by a predeterminable area around the pixel to be classified,
   wherein the at least one second class is associated with a respective specific defect, wherein the respective specific defect is selected from the following group of defects: a cut-edge defect, a material defect, a flatness defect and a surface defect, and
   wherein the artificial neural network is a convolutional neural network.

2. The method as claimed in claim 1, wherein the classifying uses a plurality of filters and the filters are learned via a training process of the neural network.

3. The method as claimed in claim 2, wherein the classifying is performed based on a pixel area from the fusion image, wherein the pixel area is ascertained via an artificial neural network and the classifying classifies pixel-by-pixel or pixel-area-by-pixel-area based on the ascertained pixel area.

4. The method as claimed in claim 2, further comprising:
   reducing signal noise to at least one classification result and the signal is generated based on a noise-reduced classification result.

5. The method as claimed in claim 1, wherein the classifying is performed based on a pixel area from the fusion image, wherein the pixel area is ascertained via an artificial neural network and the classifying classifies pixel-by-pixel or pixel-area-by-pixel-area based on the ascertained pixel area.

6. The method as claimed in claim 1, further comprising:
reducing signal noise to at least one classification result and the signal is generated based on a noise-reduced classification result.

7. The method as claimed in claim 1, wherein at least one of the first class and the at least one second class is represented in a spatially resolved manner.

8. An apparatus for carrying out a method for the automatic classification of emitter structures for the generation of X-rays, the apparatus comprising:
an interface configured to receive a bright-field image of the emitter structures, a dark-field image of the emitter structures or a fusion image of the emitter structures generated from the bright-field image and the dark-field image;
at least one processor configured to execute machine-readable program code, which, when executed, causes the apparatus to perform the method of claim 1; and
a signal-output interface for outputting a signal based on the class ascertained for the emitter structure via the classification.

9. A non-transitory computer-readable medium storing instructions, which, when executed by one or more processors, cause the one or more processors to perform the method as claimed in claim 1.

10. A method for reproducing a classification of an emitter structure, the method comprising:
receiving a signal, wherein the signal is generated using the method as claimed in claim 1; and
reproducing the emitter structure and the at least one class assigned to the emitter structure based on the received signal.

11. An apparatus for reproducing a classification of an emitter structure, the apparatus comprising:
an interface for receiving the received signal of claim 10; and
at least one processor configured to execute machine-readable program code, which, when executed, causes the apparatus to
reproduce the emitter structure and the at least one class assigned to the emitter structure based on the received signal.

12. A control facility comprising:
a first computer configured to execute machine-readable program code including control instructions, which, when executed by the first computer, cause a bright-field image and a dark-field image of a same emitter structure or a fusion image from the bright-field image or the dark-field image to be sent to an apparatus for carrying out a method for an automatic classification of emitter structures, wherein the control instructions furthermore cause a method as claimed in claim 1 to be carried out by an apparatus for carrying out a method for the automatic classification of emitter structures and cause a signal based on a class ascertained for the same emitter structure generated by the apparatus to be receivable by the first computer.

* * * * *